June 16, 1959  A. G. SCHILBERG  2,890,911
PRESSED STEEL TRUCK WHEEL
Filed May 21, 1956  2 Sheets-Sheet 1

INVENTOR.
ARNOLD G. SCHILBERG
BY
Andrus & Sceales
Attorneys

June 16, 1959 A. G. SCHILBERG 2,890,911
PRESSED STEEL TRUCK WHEEL
Filed May 21, 1956 2 Sheets-Sheet 2
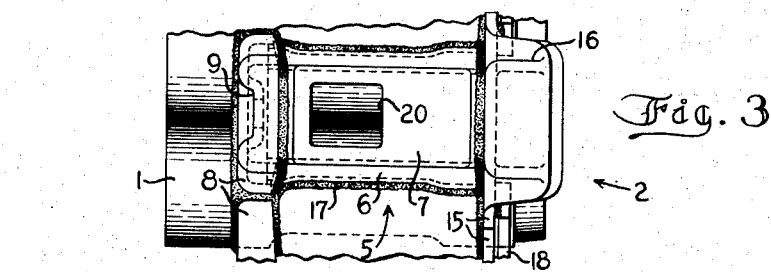
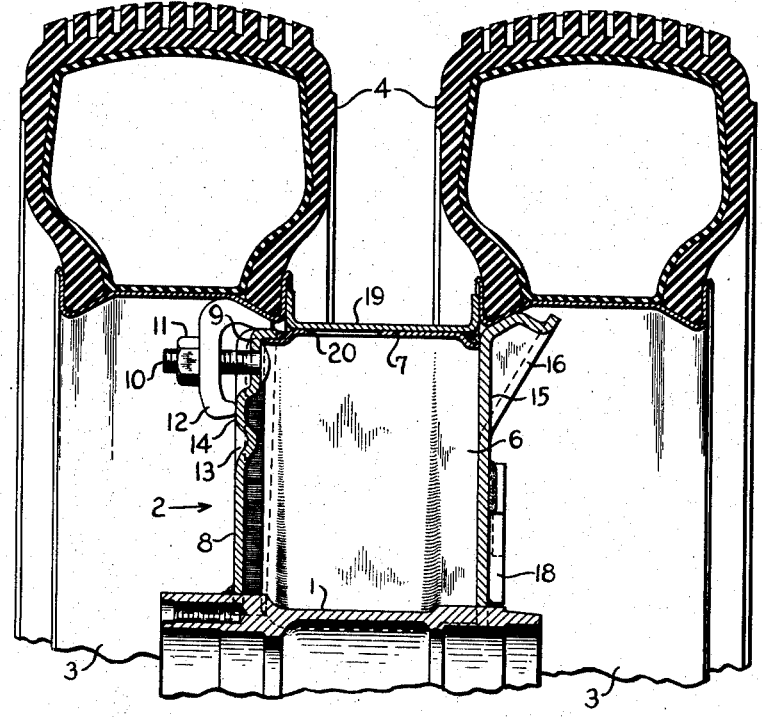
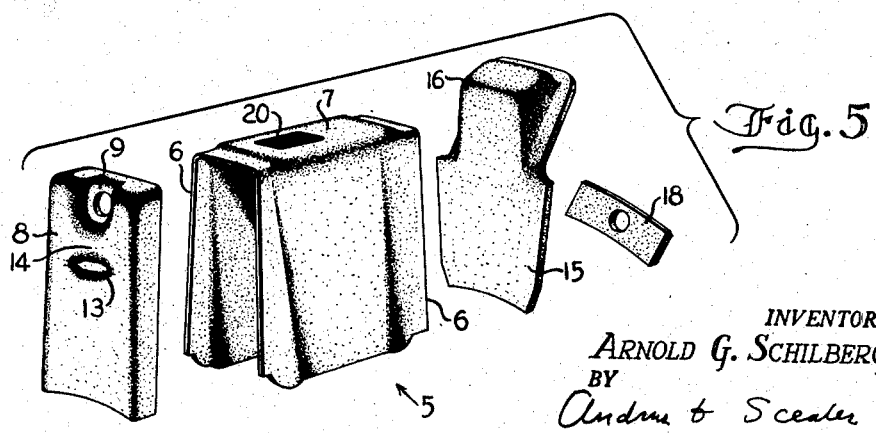
INVENTOR.
ARNOLD G. SCHILBERG
BY
Andrew & Scealer
Attorneys

United States Patent Office 2,890,911
Patented June 16, 1959

2,890,911

PRESSED STEEL TRUCK WHEEL

Arnold G. Schilberg, Milwaukee, Wis., assignor to A. O. Smith Corporation, Milwaukee, Wis., a corporation of New York Application May 21, 1956, Serial No. 586,272

2 Claims. (Cl. 301—13)

This invention relates to a pressed steel truck wheel, and more particularly to a pressed steel dual wheel adapted for heavy duty work on trucks, trailers and the like.

The invention contemplates, generally, a rotatable metal hub member having a plurality of circumferentially spaced separate metal spoke members rigidly secured to the hub and extending outwardly therefrom. The spoke members are of generally rectangular tubular construction and are constructed to minimize leakage of water, silt and the like from the outside to reduce wheel unbalance and other problems. One pair of sides of each spoke extend generally parallel to the axis of the hub, while the other pair of sides extend generally transverse to the axis of the hub to provide a box-like spoke structure of each spoke member.

The particular construction provides a dual wheel of high strength and rigidity and capable of withstanding high braking and side loads during operation of the vehicle.

The accompanying drawings illustrate the best mode presently contemplated by the inventor for carrying out the invention.

In the drawings:

Fig. 3 is a fragmentary top plan view of the wheel;

Fig. 4 is a vertical section showing a portion of the wheel as assembled with a pair of tires and tire rims; and Fig. 5 is an exploded detail perspective view showing the spoke components.

Figure 1:
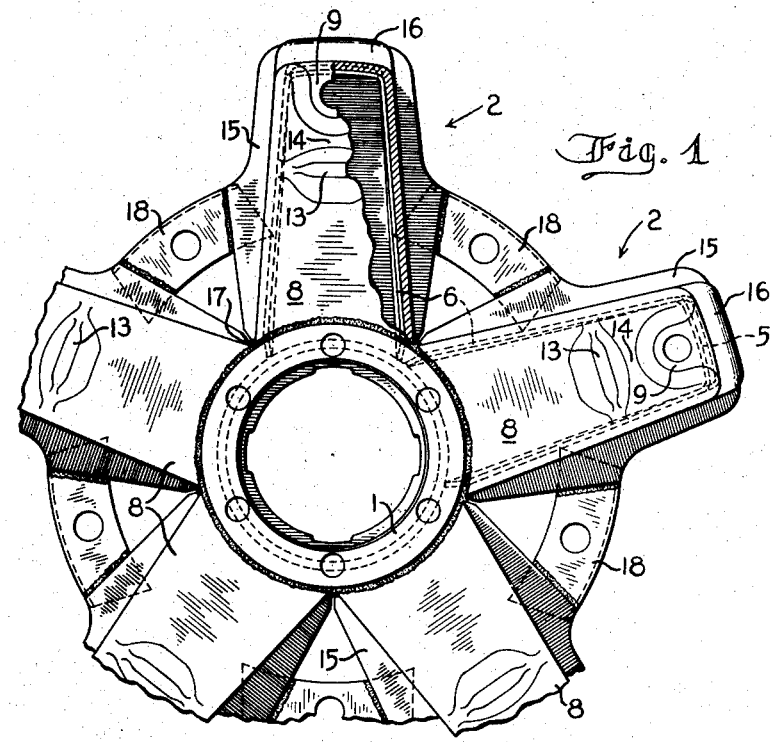
Figure 1 is a front elevation of the wheel with portions broken away to show details of structure.

As shown in the drawings, the wheel comprises, in general, a hub member 1 and a plurality of separate spaced pressed steel spoke members 2 secured to the hub and extending radially outwardly therefrom. Spokes 2 serve to receive a pair of tire rims 3 and tires 4, as will be described hereinafter.

The inner end portion of hub 1 extends inwardly beyond spokes 2 to support a bearing grease retainer, not shown, and the outer end portion of hub 1 extends outwardly beyond spokes 2 to receive an axle driving flange, not shown, which is bolted thereto. Where the invention is to be applied to a non-driving wheel, such as for trailers, the wheel may be modified to reduce the hub size and eliminate the outer extension of the hub.

Each spoke 2 comprises a central generally U-shaped member 5 having a pair of outwardly extending spaced flanges 6 joined at their outer ends by a web 7. The inner edges of flanges 6 extend generally parallel to the longitudinal axis of hub 1 and are welded contiguously to the outer surface of the hub. U-shaped member 5 is the basic or foundation member of the spoke of the invention. The distance between each pair of flanges 6 of member 5 is slightly greater adjacent the hub than adjacent web 7 so that flanges 6 converge outwardly. A strong root connection for the spoke is thereby provided. The outboard edge of each web 7 and outboard radial edge of each flange 6 is contoured inwardly slightly to overlappingly receive the flanged edges of a front or outboard spoke plate 8 which is intimately welded to the hub and to the contoured web portion.

Each plate 8 extends radially from hub 1 and is provided with an arcuate concave edge which abuts hub 1 contiguously and is suitably welded thereto. The plate is substantially rectangular in shape with a slight tapered increase in width in a radially inward direction, corresponding to the increased distance between flanges 6 adjacent the hub.

To entirely close the outboard opening between flanges 6 and to increase the strength of the spoke 2 in both a radial and axial direction, the radial edges of each outboard spoke plate 8 are flanged inwardly and overlap the outboard contoured surfaces of flanges 6 and are welded thereto. The inner ends of the plate flanges abut and are welded to hub 1 in such a manner that the arcuate edge and radial flanges of plate 8 are secured to hub 1 in a continuous weld. Any hub contour requires a corresponding contour of flanges 6 to provide a continuous joint.

The upper end portion of spoke plate 8 is provided with a substantially circular axially inboardly extending embossment 9 having an aperture therein to receive lug bolts 10 which, together with their corresponding nuts 11, serve to secure lugs 12 to the spoke. An axially inboardly extending embossment or lip 13 is spaced radially inwardly from embossment 9, the portion of plate 8 between the two embossments forming, in effect, a reinforcing projection 14 adapted to seat one end of lug 12. The other end portion of lug 12 is disposed adjacent the horizontal flange of plate 8 and adjacent web 7 for purposes to be described.

The inboard opening between the flanges 6 of each U-shaped member 5 is closed by a radially extending rear or inboard spoke plate 15 which has an arcuate concave edge disposed adjacent and contiguous with hub 1 and intimately welded thereto. Plate 15 is generally rectangular and circumferentially overlaps the inner radial edges of flanges 6 which are welded to plate 15.

The upper end portion of plate 15 is formed inboardly and has an outboardly extending embossment 16 which is adapted to support the inner tire rim 3.

Plate 15 is secured to the inner edge portion of member 5 by a suitable weld.

Figure 2:
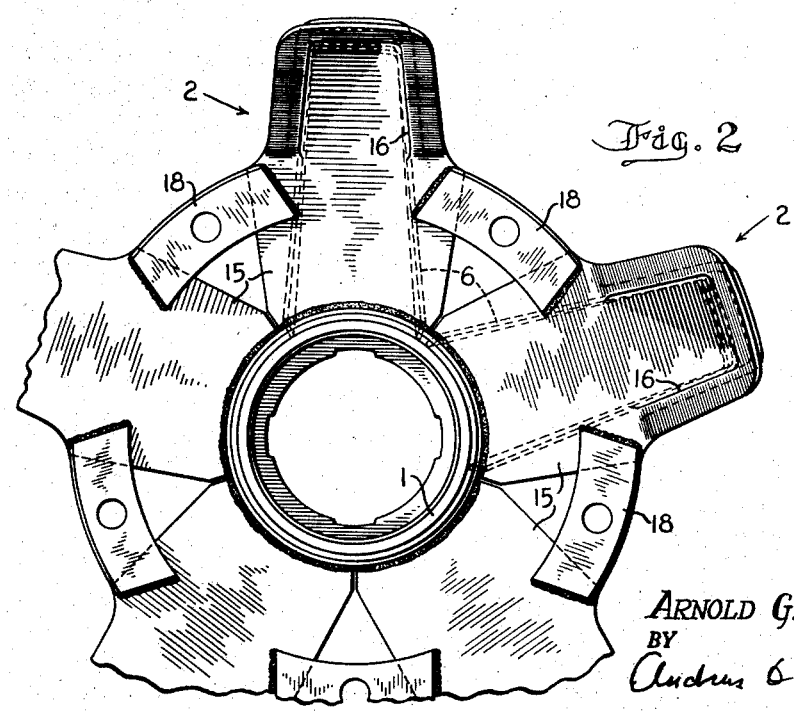
Fig. 2 is a rear elevation of the wheel.

A plurality of spoke members 2 are disposed around hub 1 with all the spokes being constructed in a manner similar to that described above. The root of a flange 6 on each spoke is joined to the hub and connected to the root of an adjacent flange 6 by a single mutual weld 17. Inboard plates 15 are extended, as best shown in Fig. 2, to permit a plurality of spaced arcuate brake drum plates 18 to be located on and secured thereto.

Lugs 12 and embossments 16 serve to support outer and inner tire rims 3, which in turn receive the vehicle tires 4. The inner portions of rims 3 are flanged for engagement with an annular spacer ring 19 which rides concentrically and freely on webs 7 and is disposed between the rims. Tightening of lugs 12 against the spokes biases the outboard rim 3 against ring 19, which in turn tightens inboard rim 3 against the embossment 16, thereby securing the rims to the wheel. Lugs 12 are shaped to bias their respective rims 3 inboardly, while embossments 16 are shaped to limit the inboard movement of their respective rims 3.

The hub, channel and plate members are so disposed that, with the use of continuous welds to join them, the interior of the wheel is kept relatively free of mud, stones and other debris, thus preventing loss of efficiency of the wheel due to increased unsprung weight, wheel unbalance and the like. All of the welds are continuous and interconnect at both ends with one another. Fatigue of the structure is reduced since there are no weld terminations adjacent points subjected to high stress. The type of weld utilized readily lends itself to automatic type welding.

If it is desired to have bolt access openings 20 in webs 7, the box-like spokes will remain substantially enclosed, since spacer ring 19 will cover the openings 20.

In addition, the independently mounted rectangular absolute box section spokes provide a wheel which is relatively strong and capable of withstanding high braking and side loads in either direction. The wheel is easier to fabricate and more efficient in its use of materials than complicated truss-type wheels, and gives better performance.

In the case of circumferential loads such as driving and braking forces, spoke plates 8 and 15 provide high shear value so that flanges 6 provide the maximum amount of outer fiber material, similar to the flanges of an I-beam. In the case of axial or side loads, flanges 6 provide high shear value so that plates 8 and 15 provide the maximum amount of outer fiber material.

The rectangular substantially enclosed box, provided by the spoke member joined to the hub, is the most efficient for resisting bending in both circumferential and axial directions.

The rectangular or box section spokes have a relatively high torsion value to resist twisting about the radial axis of the spokes, especially under uneven or eccentric driving or braking forces, as where one wheel goes over a bump which lifts the other wheel off the road.

Plates 8 and 15 and U-shaped members 5 are shown as being constructed of equal gauge metal. Actually, members 5 may be made of thinner gauge than the spoke plates, since the latter carry the heaviest bearing and other loads.

Although a wheel having five spokes is shown, any suitable number of spokes may be used.

Various modes of carrying out the invention are contemplated as being within the scope of the following claims particularly pointing out and distinctly claiming the subject matter which is regarded as the invention.

I claim:

1. In a pressed steel wheel assembly for use with the tire rims of trucks or the like, a hub, a plurality of circumferentially spaced separate rectangular enclosed spoke members assembled on the hub and extending radially outwardly therefrom for supporting the tire rims, each of said spoke members comprising a generally U-shaped member having a pair of outwardly converging spaced flanges disposed in contiguous contact with the hub at their inner ends and integrally joined at their outer ends by a web, the outboard edge portions of said flanges and web being contoured inwardly, a radially extending separate outboard spoke plate contacting the hub in contiguous relationship and disposed in overlapping relation with the inwardly contoured portions of said flanges and said web to provide support for an outboard tire rim, a radially extending separate inboard spoke plate contacting the hub in contiguous relationship and in intimate contact with the inboard edge portions of said flanges and said web, said inboard spoke plate having an embossed support for receiving an inboard tire rim, continuous weld means joining said U-shaped member with said outboard and inboard spoke members to form a spoke assembly, and second weld means continuous with said first-named weld means and joining said assembly with said hub to provide a substantially enclosed spoke of box-like configuration, each end of each weld portion interconnecting with the end of an adjacent weld portion to seal the assembly.

2. A dual wheel and rim assembly comprising a rotatable hub, a plurality of circumferentially spaced outwardly tapered generally U-shaped members with each member having a pair of outwardly extending spaced flanges intimately welded to the hub at their inner ends and joined by a web at their outer ends, the outboard edge portions of said flanges and web being contoured inwardly, an annular spacer ring concentric with said webs and disposed in free riding relationship therewith, a plurality of separate outwardly tapered radially extending outboard spoke plates and with each plate welded to the hub and disposed in overlapping relation with the inward contoured portions of the outboard edges of each U-shaped member and welded thereto and closing the front opening therein, an outboardly extending embossment disposed adjacent the upper end portion of each outboard spoke plate, means seated on said embossment and seated on the portion of said plate which overlaps the web for supporting an outboard tire rim and for biasing the latter into engagement with said spacer ring, a plurality of separate radially extending inboard spoke plates and with each inboard plate welded to the hub and to the inboard edges of each U-shaped member and closing the rear opening therein, and an outboardly extending embossed support disposed adjacent the upper end portion of each inboard spoke plate for supporting a rear tire rim and for limiting the inboard movement of the latter, all of the weld joints being continuous and with each end thereof interconnecting with the end of an adjacent weld joint to seal the assembly.

References Cited in the file of this patent

UNITED STATES PATENTS

| | | |
|---|---|---|
| 1,294,825 | Parker | Feb. 18, 1919 |
| 2,607,634 | Faulkner | Aug. 19, 1952 |
| 2,660,477 | Sherman | Nov. 24, 1953 |
| 2,663,592 | Swain | Dec. 22, 1953 |